Patented June 18, 1940

2,205,184

UNITED STATES PATENT OFFICE 2,205,184

PURIFICATION OF ALDEHYDE-KETONE MIXTURES

John C. Woodhouse, Cragmere, Del., assignor to E. I. du Pont de Nemours & Company, Wilmington, Del., a corporation of Delaware No Drawing. Application July 20, 1938, Serial No. 220,270

9 Claims. (Cl. 260—593)

This invention relates to the purification of mixtures containing aldehydes and ketones and more particularly to an improved method for the removal of aldehydes from aldehyde- and ketone-containing mixtures.

Various proposals have been made previously for the separation of aldehydes and ketones from mixtures containing these two materials. Such proposals have usually involved fractional distillation or the formation of addition compounds which may be separated by filtration or fractional distillation or both.

It has been found, more frequently than not, that the boiling points of mixtures of aldehydes and ketones are so close together that separation by fractional distillation is unsatisfactory. Similarly, substituent groups often influence the formation of addition compounds which adversely affect the separation both by fractional distillation and by formation of addition compounds.

It is an object of this invention to overcome these and other disadvantages of the prior art.

It is a further object of this invention to provide an improved method for the purification of aldehyde and ketone mixtures of their aldehyde content.

Other objects and advantages of this invention will be apparent by reference to the following specification wherein the preferred details and embodiments are described.

According to this invention, aldehyde- and ketone-containing mixtures are purified of their aldehyde content by subjecting such mixtures to low temperature, moderate pressure hydrogenation in the presence of a catalyst active for hydrogenation.

Although aldehydes and ketones are so closely allied that effective hydrogenation of the one without concurrent hydrogenation of the other might be questioned, I have found that by the use of controlled low temperatures and moderate pressures, aldehyde-ketone mixtures may be substantially if not wholly purified of their aldehyde content without a corresponding effect upon the ketone content of the mixture.

The temperatures utilized according to this invention may vary over a fairly wide range but best results have been obtained by use of temperatures from 40° C. to not greatly above 125° C., the temperature preferably being selected within the range of 40-80° C. Similarly, the pressure may also be varied over a fairly wide range such as from 30 to 400 atmospheres altho, preferably, I utilize pressures in the range of 82 to 200 atmospheres.

Any catalyst active for hydrogenation may be employed such as reduced and finely divided copper, nickel and cobalt metals, metal oxides and salts of the metals, difficultly reducible heavy metal oxides such as chromates, tungstates and vanadates, "Raney" nickel catalyst and copper alloys containing nickel, cobalt, silicon or magnesium and the like. Specifically, however, catalysts such as reduced nickel, cobalt or copper oxides, supported and unsupported, are preferred.

Thus, for example, in the purification of the mixture of alcohols obtainable in the catalytic pressure hydrogenation of oxide of carbon, there is obtained a mixture containing substantial quantities of aldehydes and ketones. I have found that the aldehyde content of such a mixture, originally comprising about 50% aldehydes and 50% ketones, may be satisfactorily purified of its aldehyde content according to this invention. To illustrate, 150 grams of an aldehyde-ketone mixture, such as above described, was subjected to hydrogenation in a closed vessel, by passage therethrough of hydrogen, in the presence of 12 grams of a nickel-on-kieselguhr catalyst. The pressure in the vessel was maintained at 1600–1800 pounds per square inch and the temperature was maintained at 70° C. At the expiration of one hour the aldehyde content was reduced by 98.7% while the ketone was reduced only 4.3%.

As a second example illustrating my invention, 1500 g. of a mixture containing about 40% di-isopropyl ketone (b. p. 124° C.) and 60% 2-methyl pentanal (b. p. 119° C.) and obtained by oxidizing the fraction of alcohols boiling in the range 135–150° C., produced in the synthesis of methanol from hydrogen and carbon monoxide, was hydrogenated at 60–70° C. and 1500 lbs. per square inch pressure using 60 g. of Raney nickel catalyst. The hydrogenated crude contained about 5% 2-methyl pentanal, 35% di-isopropyl ketone, 5% di-isopropyl carbinol (b. p. 139° C.) and 55% 2-methyl pentanol-1 (b. p. 148° C.). 1000 g. of this mixture was distilled and there was recovered 250 g. of pure di-isopropyl ketone and 500 g. of pure 2-methyl pentanol-1.

In a similar manner, other aldehyde-ketone mixtures have been treated according to this invention and, likewise, it has been found that the aldehyde content is greatly reduced, if not wholly removed, without concurrent and extensive reduction of the ketone content. Therefore, although examples have been given of specific aldehyde-ketone mixtures and their purification of aldehyde content, it should be understood that the present invention provides a method for the treatment of aldehyde-ketone mixtures generally to purify such mixtures of their aldehyde content.

Various changes may be made in the details and methods of this invention without departing therefrom or sacrificing any of the advantages thereof.

I claim:

1. A method for purifying aldehyde and ketone containing mixtures of their aldehyde content which comprises subjecting such mixtures to hydrogenation at elevated pressures in the range of 30 to 400 atmospheres, at temperatures of 40° C. to 125° C., and in the presence of a catalyst active for hydrogenation.

2. A method for purifying aldehyde and ketone containing mixtures of their aldehyde content which comprises subjecting such mixtures to hydrogenation at elevated pressures in the range of 82 to 200 atmospheres, at temperatures of 40° C. to 125° C., and in the presence of a catalyst active for hydrogenation.

3. A method for purifying aldehyde and ketone containing mixtures of their aldehyde content which comprises subjecting such mixtures to hydrogenation at pressures in the range of 82 to 200 atmospheres, at temperatures of 40° C. to 125° C. and in the presence of a nickel catalyst active for hydrogenation.

4. A method for purifying aldehyde and ketone containing mixtures of their aldehyde content which comprises subjecting such mixtures to hydrogenation at a pressure in the range of 82 to 200 atmospheres and at a temperature in the range of from 40° C. to 80° C. and in the presence of a catalyst active for hydrogenation.

5. A method for purifying aldehyde and ketone containing mixtures of their aldehyde content which comprises subjecting such mixtures to hydrogenation at a pressure in the range of 82 to 200 atmospheres and at temperature in the range of from 40° C. to 80° C., and in the presence of a nickel catalyst.

6. A method for purifying aldehyde and ketone containing mixtures of their aldehyde content which comprises subjecting such mixtures to hydrogenation in the presence of a catalyst active for hydrogenation at a temperature of 40° C. to 125° C. and a pressure of above 30 atmospheres.

7. A method for purifying aldehyde and ketone containing mixtures of their aldehyde content which comprises subjecting such mixtures to hydrogenation in the presence of a catalyst active for hydrogenation at a temperature of 40° C. to 80° C. and a pressure of above 30 atmospheres.

8. A method for purifying aldehyde and ketone containing mixtures of their aldehyde content which comprises subjecting such mixtures to hydrogenation in the presence of a nickel catalyst active for hydrogenation at a temperature of 40° C. to 125° C. and a pressure of above 30 atmospheres.

9. A method for purifying aldehyde and ketone containing mixtures of their aldehyde content which comprises subjecting such mixtures to hydrogenation in the presence of a nickel catalyst active for hydrogenation at a temperature of 40° C. to 80° C. and a pressure of above 30 atmospheres.

JOHN C. WOODHOUSE.